US012692198B2

(12) United States Patent
Xiao et al.

(10) Patent No.: US 12,692,198 B2
(45) Date of Patent: Jul. 28, 2026

(54) PREPARATION METHOD AND USE OF HIGH-ENTROPY ALLOY (HEA)@CARBON FIBER COMPOSITE NANOMATERIAL

(71) Applicant: Yangtze University, Jingzhou City (CN)

(72) Inventors: Wei Xiao, Jingzhou City (CN); Yu Xin, Jingzhou City (CN); Chengjin Liu, Jingzhou City (CN); Chang Miao, Jingzhou City (CN); Shi Pan, Jingzhou City (CN); Shuqing Nie, Jingzhou City (CN)

(73) Assignee: Yangtze University, Jingzhou City (CN)

( * ) Notice: Subject to any disclaimer, the term of this patent is extended or adjusted under 35 U.S.C. 154(b) by 65 days.

(21) Appl. No.: 19/023,538

(22) Filed: Jan. 16, 2025

(65) Prior Publication Data

US 2025/0304503 A1 Oct. 2, 2025

(30) Foreign Application Priority Data

Mar. 27, 2024 (CN) .......................... 202410357071.0

(51) Int. Cl.
| | |
|---|---|
| *C04B 35/524* | (2006.01) |
| *C04B 35/622* | (2006.01) |
| *C04B 35/626* | (2006.01) |
| *C04B 35/64* | (2006.01) |

(52) U.S. Cl.
CPC ...... *C04B 35/524* (2013.01); *C04B 35/62272* (2013.01); *C04B 35/62655* (2013.01); *C04B 35/62675* (2013.01); *C04B 35/64* (2013.01); *C04B 2235/407* (2013.01); *C04B 2235/422* (2013.01); *C04B 2235/444* (2013.01); *C04B 2235/449* (2013.01); *C04B 2235/48* (2013.01); *C04B 2235/6562* (2013.01); *C04B 2235/6567* (2013.01); *C04B 2235/661* (2013.01)

(58) Field of Classification Search
CPC ... B29C 65/521; B29C 65/368; B29C 65/348; B29C 45/14426; B29C 41/30; B29C 45/14786; B29C 45/14631; B29C 2045/14557; B29C 41/08
See application file for complete search history.

*Primary Examiner* — Stella K Yi

(74) *Attorney, Agent, or Firm* — Tutunjian & Bitetto, P.C.

(57) ABSTRACT

Provided are a preparation method and use of a high-entropy alloy (HEA)@carbon fiber composite nanomaterial. Five or more metal salts of different metal elements are dissolved in an organic solvent, a complexing agent is added to obtain a mixture, and then the mixture is stirred to obtain a mixed metal salt solution. A polymer is added to the mixed metal salt solution, and dissolved by stirring to obtain an electrospinning precursor solution. The electrospinning precursor solution is transferred into a syringe and the syringe and a syringe needle is kept free of air bubbles, and electrospinning is then conducted to obtain a precursor fiber membrane. The precursor fiber membrane is subjected to vacuum drying, a resulting dried sample is subjected to pre-sintering, and a resulting pre-sintered sample is then subjected to calcination to obtain the HEA@carbon fiber composite nanomaterial.

7 Claims, 5 Drawing Sheets

PREPARATION METHOD AND USE OF HIGH-ENTROPY ALLOY (HEA)@CARBON FIBER COMPOSITE NANOMATERIAL

CROSS REFERENCE TO RELATED APPLICATION

This patent application claims the benefit and priority of Chinese Patent Application No. 202410357071.0 filed with the China National Intellectual Property Administration on Mar. 27, 2024, the disclosure of which is incorporated by reference herein in its entirety as part of the present application.

TECHNICAL FIELD

The present disclosure relates to the technical field of alloy material preparation, and specifically discloses a preparation method and use of a high-entropy alloy (HEA) @carbon fiber composite nanomaterial.

BACKGROUND

High-entropy alloy (HEA), an emerging concept in the field of metal alloys, is a novel single-phase material created by combining five or more metal elements. Different from those in traditional alloys, atoms of each element in the HEA are randomly and disorderly distributed in the lattice positions, thus exhibiting a high-entropy effect in thermodynamics. As a novel material, the HEA circumvents the traditional concept of "basic elements" and exhibits various interesting and unusual properties. Due to the excellent electrical conductivity and unique high-entropy effect, HEAs are considered as promising electrode materials for advanced energy storage and conversion technologies. Especially in the field of negative electrode materials for lithium-ion batteries (LIBs), expanding a single high-purity element to an HEA system is conducive to alleviating the two major problems faced by alloy-type negative electrode materials for LIBs: low initial coulombic efficiency and rapid capacity decay due to volume expansion.

At present, methods for preparing an HEA mainly include arc melting, thermal spraying, and mechanical die casting. The arc melting requires a high processing temperature, which inevitably causes particle agglomeration. The mechanical die casting and thermal spraying have high energy consumption and easy oxidation, and also need to go through a pressing process when preparing block products. Moreover, the above-mentioned preparation methods generally show high preparation cost and long processing route. More importantly, HEAs prepared in the prior art have a size that is difficult to meet the requirements of nanoparticles, which is not conducive to reducing the absolute volume change of the electrode material, resulting in destruction of the material structure, rapid capacity decay, and unstable electrochemical performance. Therefore, it is a key issue in the research of alloy-type negative electrode materials for LIBs to develop a universal preparation strategy for further expanding the composition space of materials and designing HEAs with nanoparticle structure and uniform size.

SUMMARY

In view of the deficiencies in the prior art, the present disclosure aims to provide an HEA@carbon fiber composite nanomaterial (@ herein represents "coated", and HEA@carbon fiber composite nanomaterial means "HEA coated carbon fiber composite nanomaterial"). HEA nanoparticles composed of five or more different metal elements are successfully encapsulated into mutually-entangled conductive carbon nanofibers by using electrospinning and sintering processes, avoiding an uneven size of the HEA nanoparticles and a weak binding force thereof with a carbon-based material. When being applied in the field of negative electrode materials for LIBs, the composite nanomaterial could provide a desirable electrochemical performance.

The present disclosure provides the following technical solutions.

The present disclosure provides a method for preparing an HEA@carbon fiber composite nanomaterial, including the following steps:

(1) dissolving five or more metal salts of different metal elements weighed according to a target proportion in an organic solvent, adding a complexing agent to obtain a mixture, and then stirring the mixture at room temperature until the metal salts and the complexing agent are dissolved (in some embodiments, the dissolving is conducted for 2 h to 24 h, and the stirring is conducted at room temperature for 4 h) to obtain a mixed metal salt solution;

(2) adding a polymer to the mixed metal salt solution obtained in step (1), dissolving by stirring, with a dissolution temperature of 20° C. to 80° C. and a dissolution time of 4 h to 36 h (in some embodiments, the stirring is conducted at 60° C. for 16 h) to obtain an electrospinning precursor solution;

(3) transferring the electrospinning precursor solution obtained in step (2) into a syringe and keeping the syringe and a syringe needle free of air bubbles, and then conducting electrospinning to obtain a precursor fiber membrane; and (4) subjecting the precursor fiber membrane obtained in step (3) to vacuum drying at a temperature of 40° C. to 80° C. for 12 h to 24 h (in some embodiments, the vacuum drying is conducted at 60° C. for 12 h), subjecting a resulting dried sample to pre-sintering in an air atmosphere, and then subjecting a resulting pre-sintered sample to calcination in an inert atmosphere to obtain the HEA@carbon fiber composite nanomaterial.

The electrospinning in step (3) is conducted under the following conditions: a positive voltage of 17 kV to 25 kV, a negative voltage of –0.5 kV to –2.0 kV, a syringe needle model of 23 to 20, a distance between the syringe needle and a receiver of 8 cm to 20 cm, a propulsion speed of 0.3 mm/min to 2.5 mm/min, an ambient temperature of 25° C. to 60° C., and an ambient humidity of 10% to 40%.

An aluminum foil or a silicone paper is used as the receiver, a receiving is achieved by one process selected from the group consisting of flat plate receiving and roller receiving, and during the receiving, a Taylor cone at a front end of the syringe needle remains stable without bifurcation.

In some embodiments, the high-entropy alloy (HEA) has a $S_{config}$ not less than 1.5 R, wherein the $S_{config}$ represents configurational entropy, and R represents an ideal gas constant (R=8.314 J K$^{-1}$ mol$^{-1}$).

In some embodiments, in step (1), the metal salts each are at least one selected from the group consisting of a chloride, a nitrate, a carbonate, a sulfate, and an organic salt, and a metal element in the metal salts is selected from the group consisting of tin, antimony, germanium, iron, cobalt, nickel, chromium, manganese, copper, zinc, titanium, vanadium, molybdenum, tungsten, magnesium, aluminum, and indium (in some embodiments, the metal element in the metal salts is five selected from the group consisting of tin, antimony, zinc, copper, titanium, and iron).

In some embodiments, in step (1), the metal salts in the mixed metal salt solution have a total molar concentration of 0.1 mol/L to 1.2 mol/L, and all metal elements in the metal salts have a total atomic proportion of 100%, with a percentage of each metal element ranging from 5% to 35%.

In some embodiments, the metal salts are composed of five different metal elements, with a molar ratio of the five different metal elements being in a range of (0.5-1):(0.5-1): 1:(0.5-1):(0.5-1).

In some embodiments, the complexing agent is at least one selected from the group consisting of citric acid, sodium citrate, potassium pyrophosphate, acetylacetone, diethanolamine, sodium alginate, and oxalic acid, and the complexing agent in the mixed metal salt solution has a molar concentration of 0.1 mol/L to 0.8 mol/L, preferably 0.1 mol/L to 0.4 mol/L. One part of the complexing agent could produce a complexing effect with the metal ions, overcome the strong repulsion of the immiscibility between the metal components, and accelerate the dissolution of the metal salts; the other part could act as an inhibitor, effectively preventing the reaction of the metal salts hydrolyzing into hydroxides, which is conducive to the preparation of a clear and uniform mixed metal salt solution.

In some embodiments, the organic solvent in step (1) is at least one selected from the group consisting of N,N-dimethylformamide (DMF), N,N-dimethylacetamide (DMA), tetrahydrofuran (THF), dimethylacetamide (DMA), acetone, isopropanol, hexafluoroisopropanol (HFIP), and anhydrous ethanol.

In some embodiments, in step (2), the polymer is at least one selected from the group consisting of polyacrylonitrile (PAN), polyvinylpyrrolidone (PVP), polypropylene glycol (PPG), polystyrene (PS), polybenzimidazole (PBI), polymethyl methacrylate (PMMA), polyvinyl chloride (PVC), polyetherimide (PEI), polyvinylidene fluoride (PVDF), and polyvinyl acetate (PVA), and a ratio of a mass of the polymer and a total molar number of all metal elements in the metal salt is in a range of 0.2 g:(1-2) mol. An appropriate polymer solution concentration is conducive to increasing the degree of intermolecular interconnection, thereby maintaining a stable structure and high surface area; and an interconnected structure more effectively accommodates HEA nanoparticles, promoting the uniform distribution of nanoparticles.

In some embodiments, in step (2), the stirring is conducted under a controlled temperature condition, and the controlled temperature condition refers to a constant temperature condition, which is controlled by a constant temperature water bath pot.

In some embodiments, in step (4), the pre-sintering in the air atmosphere is performed by heating to a temperature of 200° C. to 280° C. at a first heating rate of 1° C./min to 5° C./min and holding for 1 h to 3 h, and the calcination in the inert atmosphere is performed by heating to a temperature of 600° C. to 1,200° C. at a second heating rate of 1° C./min to 10° C./min and holding for 2 h to 5 h.

In some embodiments, step (4) includes heating to a temperature of 280° C. at 2° C./min and holding for 2 h in the air atmosphere, and then heating to a temperature of 800° C. to 900° C. at 2° C./min and holding for 3 h in the inert atmosphere.

In addition, the present disclosure further provides use of the HEA@carbon fiber composite nanomaterial prepared by the method aforementioned in preparation of a negative electrode material for a LIB.

Compared with the prior art, some embodiments of the present disclosure have the following outstanding features and beneficial effects:

(1) In some embodiments of the present disclosure, multiple types of metal salts and a specific complexing agent are dissolved in an organic solvent. One part of the complexing agent interacts with metal ions to form complexes, promoting the uniform dispersion of metal ions; and the other part acts as an inhibitor, effectively preventing the reaction of metal salts hydrolyzing into hydroxides. This dual action overcomes the immiscibility between strongly repelling metal components, expands the element selection range of HEA, and finally results in a homogeneous mixed metal salt solution.

(2) In the preparation method of some embodiments of the present disclosure, effective entanglement between the polymer molecular chains is promoted by adjusting the stirring temperature and time during dissolving by continuous stirring. The functional groups on the molecular chains can work together to anchor metal ions, enhancing the interaction between carbon chains and metal ions. Combined with the calcination, the HEA nanoparticles are in situ encapsulated into the conductive carbon nanofibers to obtain the HEA@carbon fiber composite nanomaterial, benefiting from the tight entanglement of the polymer molecular chains with the metal ions.

(3) In some embodiments of the present disclosure, the preparation method is simple to operate and has wide applicability, and can be used to prepare HEA nanoparticles with various elemental compositions. In the prior art, the selection of alloying elements is mostly limited to iron, cobalt, nickel, manganese, and copper, with little universality. This is because they are in the same family or have similar structural properties, making it easy for atomic position substitution to occur in the unit cell to obtain a single pure-phase HEA. However, on one hand, some of these elements are considered inert in terms of lithium storage activity and do not participate in the alloying reaction of $Li^+$. Their functions are mainly to increase conductivity and provide buffering. On the other hand, black alloys prepared from the above metals are all micron-sized alloy particles with uneven sizes and irregular morphologies. The metal components in some embodiments of the present disclosure show large space and are simple to adjust, resulting in HEA in the form of nano-sized particles. Metal components such as Sn, Sb, Zn, Ti, and Fe can be selected, which themselves have a high theoretical lithium storage capacity. Combined with electrospinning, carbon layer wrapping can be achieved in situ, thereby obtaining HEA-based negative electrode materials with enhanced electrochemical properties. In the existing field of negative electrode material preparation for LIBs, these elements are rarely used, especially Sn, Sb, and Ti are almost not involved.

(4) In some embodiments of the present disclosure, the HEA@carbon fiber composite nanomaterial prepared by the method shows excellent electrochemical properties. As a negative electrode material for a LIB, the composite nanomaterial has a discharge specific capacity of 212.0 mAh/g after 300 cycles at 1,000 mA/g.

DETAILED DESCRIPTION OF THE EMBODIMENTS

For ease of understanding on the present disclosure, the present disclosure will be described below in detail in conjunction with the accompanying drawings and specific examples. It should be understood that the specific examples described herein are only intended to explain the present disclosure and are not intended to limit the present disclosure.

Unless otherwise specified, the raw materials used in the following examples are all directly purchased common commodities.

Example 1

A method for preparing an SnSbCuFeZn HEA@carbon fiber composite nanomaterial was performed as follows:

(1) 1.00 mmol of $SnCl_2 \cdot 2H_2O$, 1.00 mmol of $SbCl_3$, 1.00 mmol of $Cu(CH_3COO)_2$, 1.00 mmol of $FeCl_3$, and 1.00 mmol of $ZnCl_2$ were weighed and dissolved in 6.00 mL of DMF, 1.00 mmol of citric acid was added thereto, and a resulting mixture was stirred magnetically at room temperature (25° C., the same below) for 4 h to obtain a light green mixed metal salt solution.

(2) 0.30 g of PAN ($M_w$=150,000, the same below) and 0.30 g of PVP ($M_w$=8,000, the same below) were weighed and dissolved in the light green mixed metal salt solution obtained in step (1), and a resulting mixture was stirred magnetically at 60° C. for 16 h to obtain a homogeneous electrospinning precursor solution.

(3) The homogeneous electrospinning precursor solution obtained in step (2) was transferred into a syringe, and the syringe and a syringe needle were kept free of air bubbles, where a syringe needle model was 22 (with an inner diameter of 0.41 mm and an outer diameter of 0.71 mm); a precursor fiber membrane was prepared by electrospinning under the following conditions: a positive voltage of 23 kV, a negative voltage of −1.5 kV, a distance between the syringe needle and a receiver of 15 cm, a propulsion speed of 1.0 mm/min, an ambient temperature of 45° C., and an ambient humidity of 12%; where the receiver was an aluminum foil, and a receiving was achieved by roller receiving.

(4) The precursor fiber membrane obtained in step (3) was subjected to vacuum drying at 60° C. for 12 h, a resulting dried sample was placed in a crucible, and heated to 280° C. at a heating rate of 2° C./min in an air atmosphere and held for 2 h and then heated to 900° C. at a heating rate of 2° C./min in a nitrogen atmosphere and held for 3 h, and a resulting heated product was cooled to room temperature to obtain the SnSbCuFeZn HEA@carbon fiber composite nanomaterial.

Figure 1:
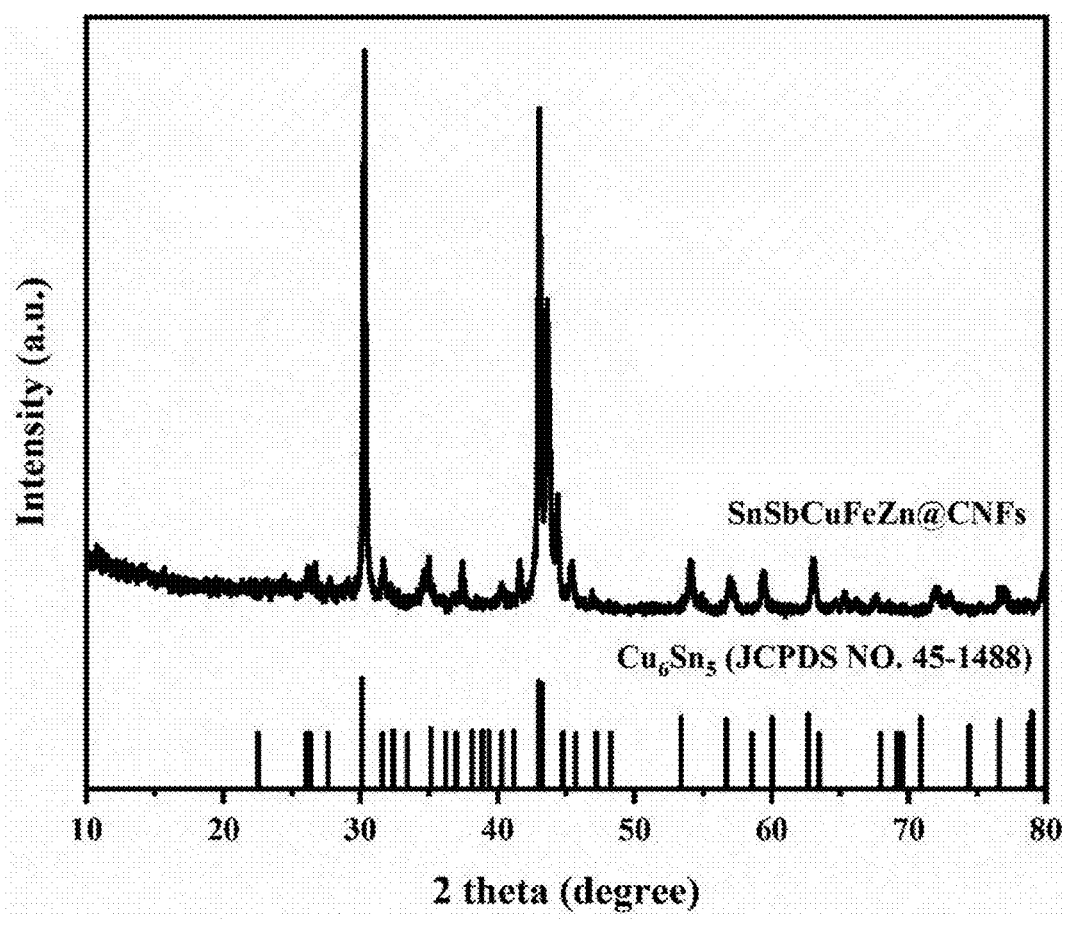
FIG. 1 shows an X-ray diffraction (XRD) pattern of the SnSbCuFeZn HEA@carbon fiber composite nanomaterial obtained in Example 1 of the present disclosure.

FIG. 1 shows an XRD pattern of the SnSbCuFeZn HEA@carbon fiber composite nanomaterial. As shown in FIG. 1, the product obtained in this example corresponds well to the standard card of $Cu_6Sn_5$ (JCPDS NO. 45-1488) and belongs to a monoclinic system. Since the atomic radius of Sb is close to that of Sn, and the atomic radius of Fe and Zn is close to that of Cu, Sb atoms partially replace Sn atoms while Fe and Zn atoms partially replace Cu atoms and are randomly distributed in the unit cell. There are no diffraction peaks of the single elements of each component in the composite nanomaterial, indicating that the composite nanomaterial has a high purity.

Figure 2A:
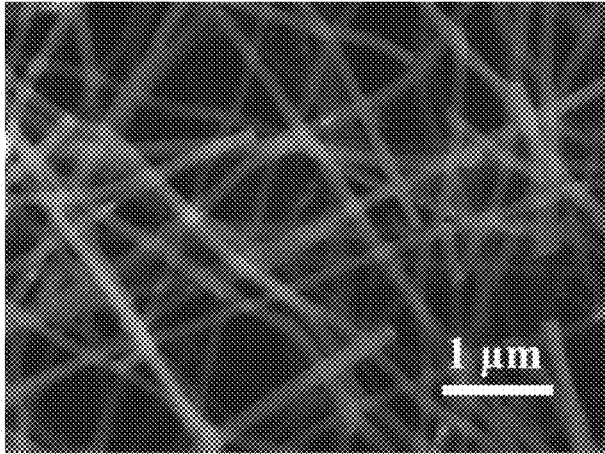
FIGS. 2A-2C show field emission-scanning electron microscopy (FE-SEM) and transmission electron microscopy (TEM) images of the SnSbCuFeZn HEA@carbon fiber composite nanomaterial obtained in Example 1 of the present disclosure.
Figure 2B:
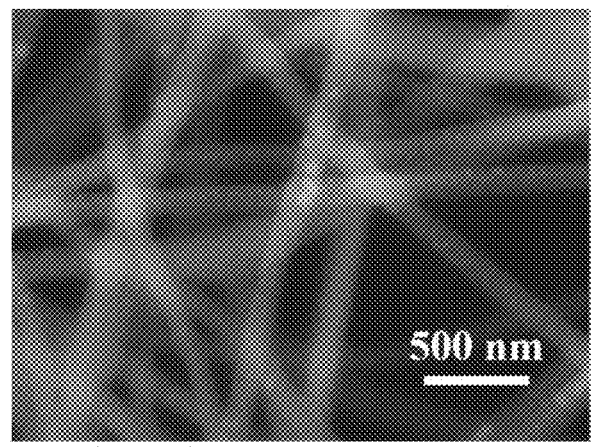
Figure 2C:
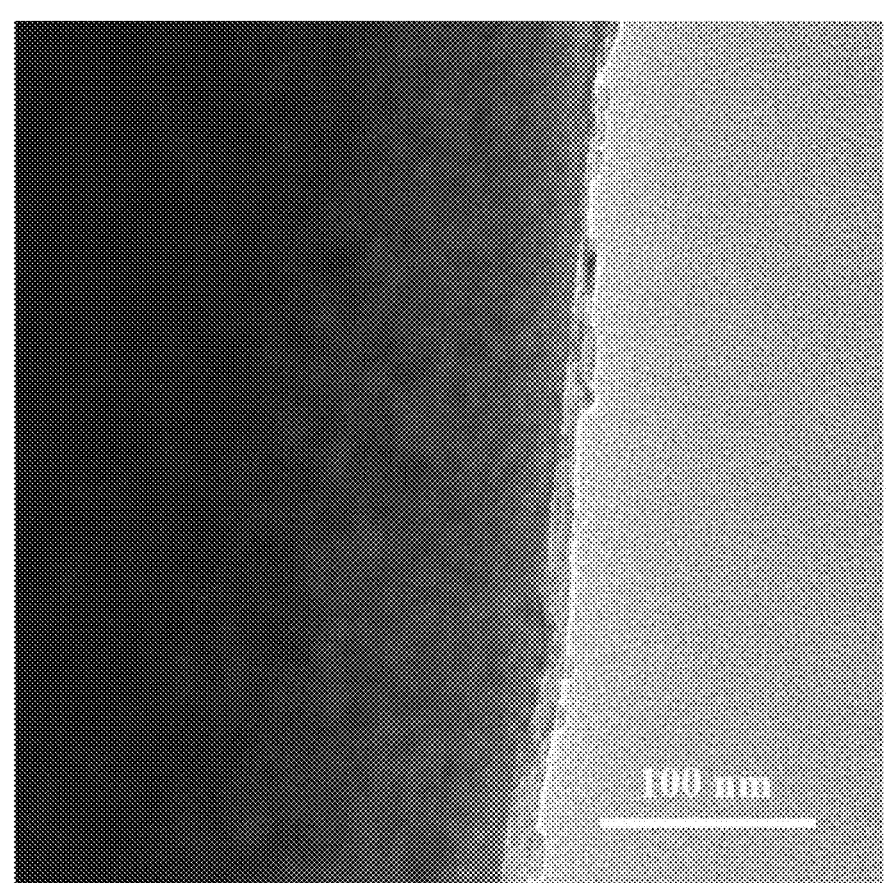

FIGS. 2A-2C show FE-SEM and TEM images of the SnSbCuFeZn HEA@carbon fiber composite nanomaterial. As shown in FIGS. 2A-2C, a large number of interconnected and entangled nanofibers randomly built into a three-dimensional (3D) network structure. The nanofibers have uniform morphology and complete structure, with a diameter of about 150 nm, and many blocky nanoparticles are tightly encapsulated inside the fibers. Combining the analysis of FIG. 1 and FIGS. 2A-2C, it can be concluded that the SnSbCuFeZn HEA nanoparticles are successfully prepared and uniformly encapsulated in the carbon nanofibers.

The SnSbCuFeZn HEA@carbon fiber composite nanomaterial prepared in this example was used in the technical field of negative electrode materials for LIBs, as an active material to prepare a working electrode, which was assembled into a button-type LIB and subjected to electrochemical performance testing.

According to a conventional slurry coating process, a slurry composed of 80 wt % of active material, 10 wt % of acetylene black, and 10 wt % of polyvinylidene fluoride was coated on a copper foil, and then the copper foil was punched out after drying to obtain a working electrode, where the active material had a loading amount of 1.0 mg/cm² on the copper foil. When assembling a LIB, a metal lithium sheet was selected as a counter electrode, an electrolyte solute was 1 mol/L $LiPF_6$, an electrolyte solvent was a mixture of ethylene carbonate, dimethyl carbonate, and diethyl carbonate (a volume ratio of the ethylene carbonate, the dimethyl carbonate, and the diethyl carbonate was 1:1:1), and a polypropylene film was used as a separator to assemble into a 2025 button-type battery.

Figure 3:
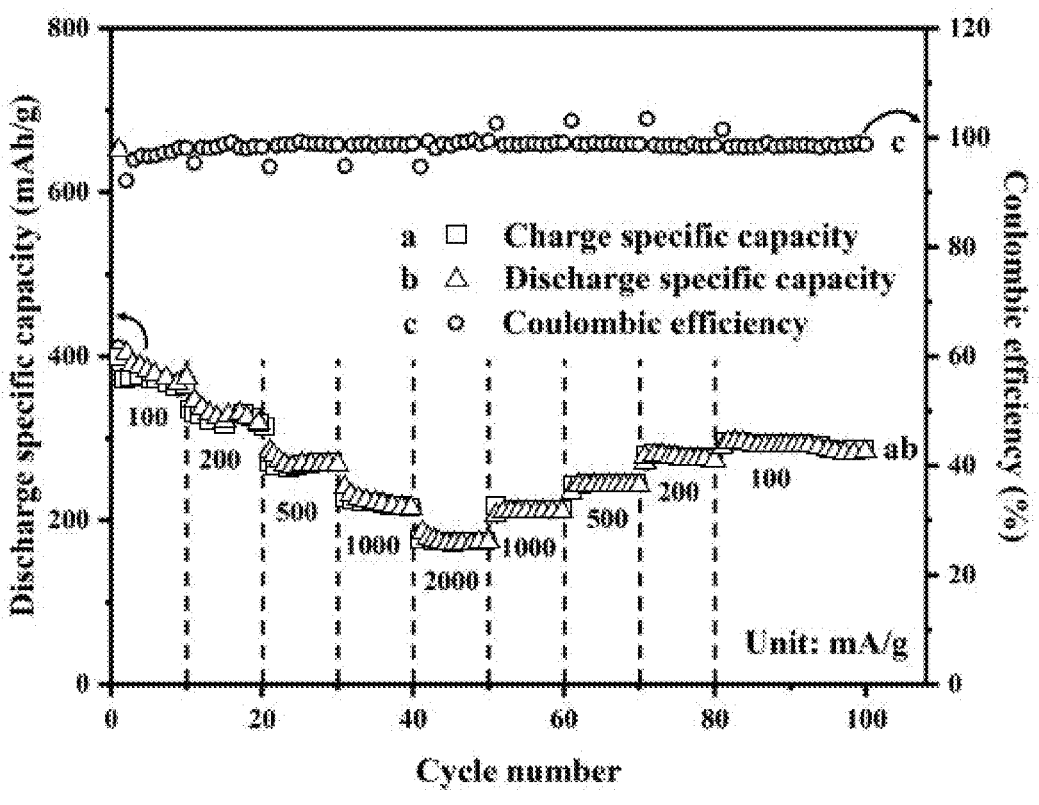
FIG. 3 shows the rate capability of a half-cell assembled with the SnSbCuFeZn HEA@carbon fiber composite nanomaterial obtained in Example 1 of the present disclosure and a metal lithium sheet.

FIG. 3 shows a rate performance curve of the button-type LIB assembled with the negative electrode material and the lithium metal sheet in this example. The test results show that an initial discharge capacity is 652.8 mAh/g, and when the current density gradually returns to 100 mA/g, a discharge specific capacity remains at 287.9 mAh/g after 100 cycles.

Figure 4:
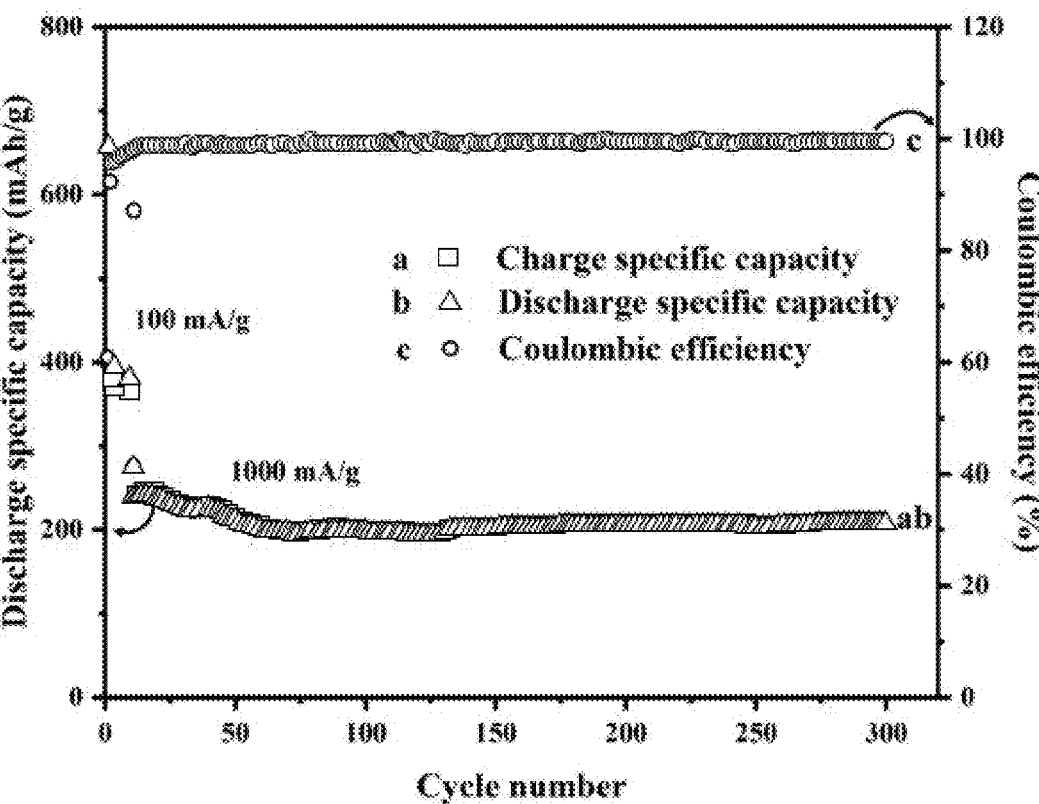
FIG. 4 shows the cycling performance of a half-cell assembled with the SnSbCuFeZn HEA@carbon fiber composite nanomaterial obtained in Example 1 of the present disclosure and a metal lithium sheet.

FIG. 4 shows a cycle performance curve of the button-type LIB assembled with the negative electrode material and the lithium metal sheet in this example. The current density was set to 100 mA/g for the first 10 cycles and 1,000 mA/g after 10 cycles. The test results show that a discharge specific capacity could reach 212.0 mAh/g after 300 cycles.

Example 2

A method for preparing an $Sn_{0.5}Sb_{0.5}CuFe_{0.5}Zn_{0.5}$ HEA@carbon fiber composite nanomaterial was performed as follows:
- (1) 0.50 mmol of $SnCl_2·2H_2O$, 0.50 mmol of $SbCl_3$, 1.00 mmol of $Cu(CH_3COO)_2$, 0.50 mmol of $FeCl_3$, and 0.50 mmol of $ZnCl_2$ were weighed and dissolved in 6.00 mL of DMF, 1.00 mmol of citric acid was added thereto, and a resulting mixture was stirred magnetically at room temperature for 4 h to obtain a light green mixed metal salt solution.
- (2) 0.30 g of PAN and 0.30 g of PVP were weighed and dissolved in the light green mixed metal salt solution obtained in step (1), and a resulting mixture was stirred magnetically at 60° C. for 16 h to obtain a homogeneous electrospinning precursor solution.
- (3) The homogeneous electrospinning precursor solution obtained in step (2) was transferred into a syringe, and the syringe and a syringe needle were kept free of air bubbles, where a syringe needle model was 22 (with an inner diameter of 0.41 mm and an outer diameter of 0.71 mm); a precursor fiber membrane was prepared by electrospinning under the following conditions: a positive voltage of 23 kV, a negative voltage of −1.5 kV, a distance between the syringe needle and a receiver of 15 cm, a propulsion speed of 1.0 mm/min, an ambient temperature of 45° C., and an ambient humidity of 12%; where the receiver was an aluminum foil, and a receiving achieved by roller receiving.
- (4) The precursor fiber membrane obtained in step (3) was subjected to vacuum drying at 60° C. for 12 h, a resulting dried sample was placed in a crucible, and heated to heating to 280° C. at a heating rate of 2° C./min in an air atmosphere and held for 2 h and then heated to 900° C. at a heating rate of 2° C./min in a nitrogen atmosphere and held for 3 h, and a resulting heated product was cooled to room temperature to obtain the $Sn_{0.5}Sb_{0.5}CuFe_{0.5}Zn_{0.5}$ HEA@carbon fiber composite nanomaterial.

Figure 5:
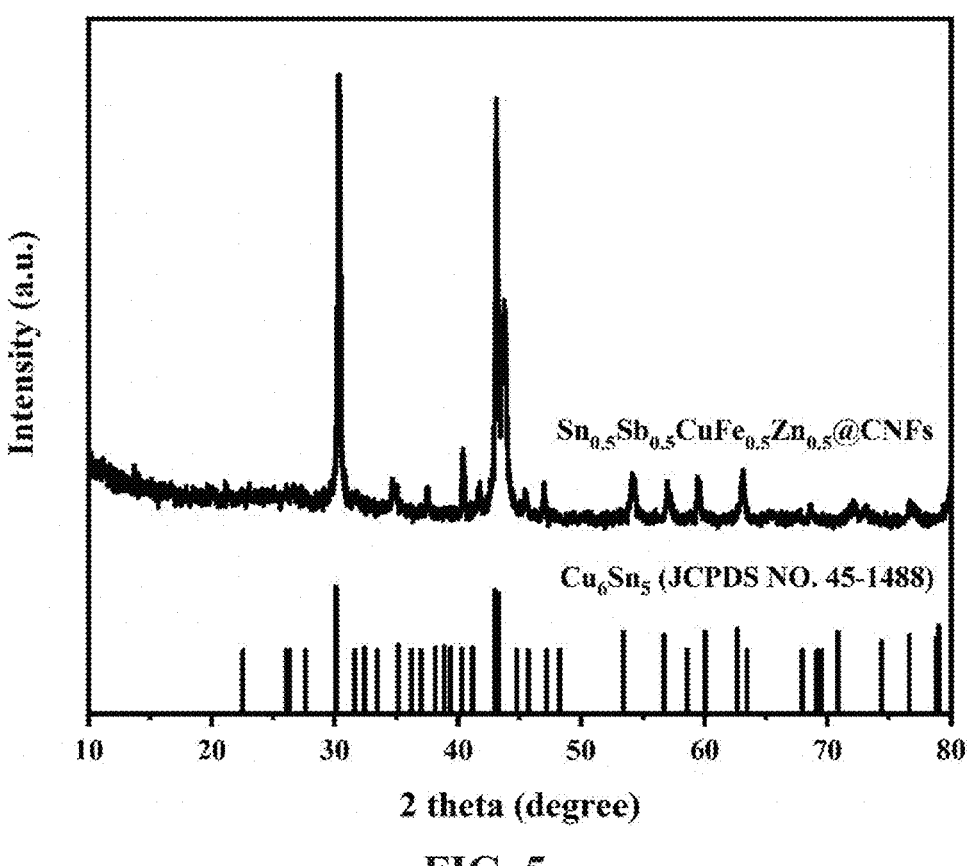
FIG. 5 shows an XRD pattern of the $Sn_{0.5}Sb_{0.5}CuFe_{0.5}Zn_{0.5}$ HEA@carbon fiber composite nanomaterial obtained in Example 2 of the present disclosure.

FIG. 5 shows an XRD pattern of the $Sn_{0.5}Sb_{0.5}CuFe_{0.5}Zn_{0.5}$ HEA@carbon fiber composite nanomaterial. As shown in FIG. 5, the product obtained in this example corresponds well to the standard card of $Cu_6Sn_5$ (JCPDS NO. 45-1488), and there are no diffraction peaks of the single elements of each component, indicating that the composite nanomaterial has a high purity. The diffraction peak is consistent with that of the SnSbCuFeZn HEA@carbon fiber composite nanomaterial obtained in Example 1, indicating that adjusting the molar ratio of each metal element does not affect the crystal structure of the composite nanomaterial.

According to the method of Example 1, the $Sn_{0.5}Sb_{0.5}CuFe_{0.5}Zn_{0.5}$ HEA@carbon fiber composite nanomaterial prepared in this example was used as a working electrode to assemble into a button-type battery, which was subjected to electrochemical performance testing. As a negative electrode material for a LIB, its discharge specific capacity could reach 210.6 mAh/g after 300 cycles at a current density of 1,000 mA/g.

Example 3

A method for preparing an SnSbCuTiZn HEA@carbon fiber composite nanomaterial was performed as follows:

- (1) 1.00 mmol of $SnCl_2·2H_2O$, 1.00 mmol of $SbCl_3$, 1.00 mmol of $Cu(CH_3COO)_2$, 1.00 mmol of $C_{12}H_{28}O_4Ti$, and 1.00 mmol of $ZnCl_2$ were weighed and dissolved in 6.00 mL of DMF, 2.00 mmol of acetylacetone was added thereto, and a resulting mixture was stirred magnetically at room temperature for 4 h to obtain a light yellow mixed metal salt solution.
- (2) 0.30 g of PAN and 0.30 g of PVP were weighed and dissolved in the light yellow mixed metal salt solution obtained in step (1), and a resulting mixture was stirred magnetically at 60° C. for 10 h to obtain a homogeneous electrospinning precursor solution.
- (3) The homogeneous electrospinning precursor solution obtained in step (2) was transferred into a syringe, and the syringe and a syringe needle were kept free of air bubbles, where a syringe needle model was 22 (with an inner diameter of 0.41 mm and an outer diameter of 0.71 mm); a precursor fiber membrane was prepared by electrospinning under the following conditions: a positive voltage of 23 kV, a negative voltage of −1.5 kV, a distance between the syringe needle and a receiver of 15 cm, a propulsion speed of 1.0 mm/min, an ambient temperature of 45° C., and an ambient humidity of 12%; where the receiver was an aluminum foil, and a receiving was achieved by roller receiving.
- (4) The precursor fiber membrane obtained in step (3) was subjected to vacuum drying at 60° C. for 12 h, a resulting dried sample was placed in a crucible, and heated to 280° C. at a heating rate of 2° C./min in an air atmosphere and held for 2 h and then heated to 900° C. at a heating rate of 2° C./min in a nitrogen atmosphere and held for 3 h, and a resulting heated product was cooled to room temperature to obtain the SnSbCuTiZn HEA@carbon fiber composite nanomaterial.

Figure 6:
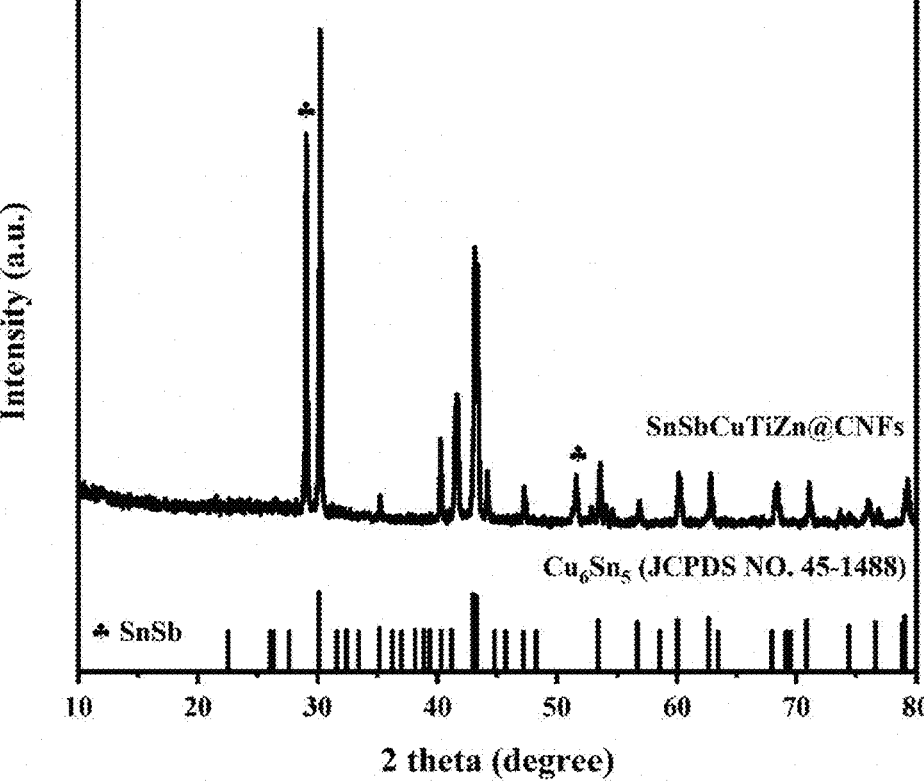
FIG. 6 shows an XRD pattern of the SnSbCuTiZn HEA@carbon fiber composite nanomaterial obtained in Example 3 of the present disclosure.
Figure 7:
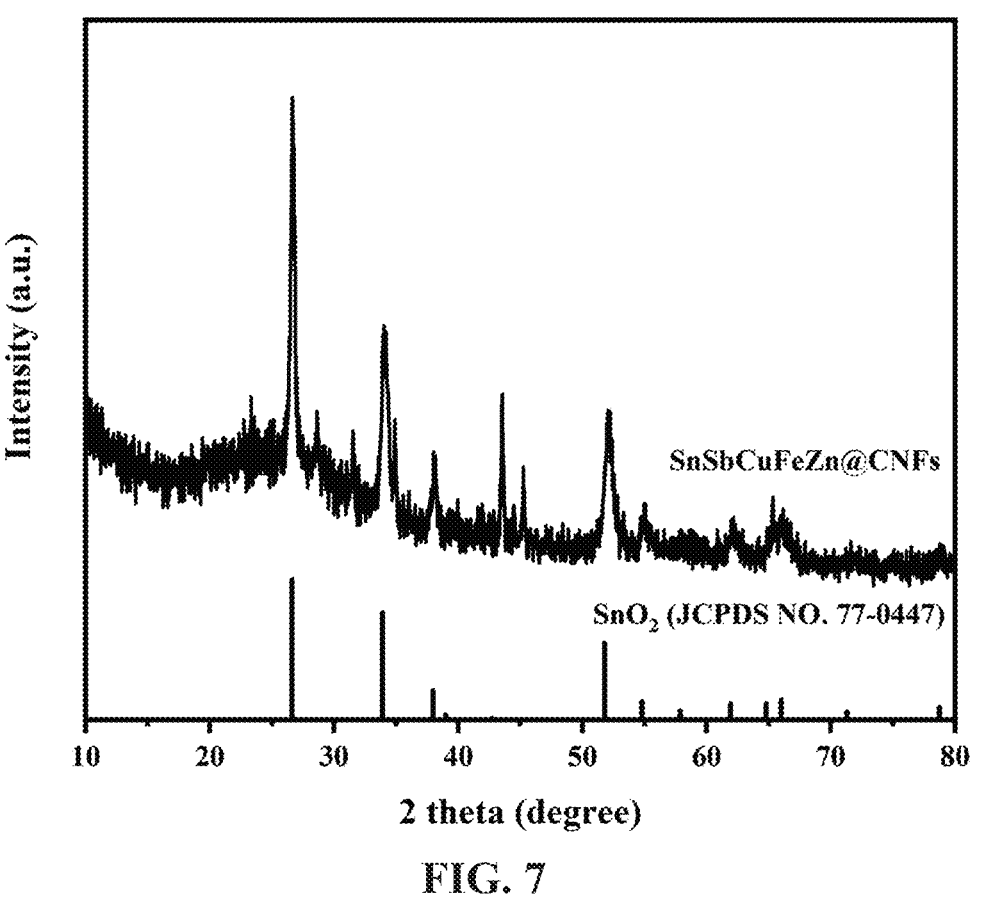
FIG. 7 shows an XRD pattern of the SnSbCuFeZn HEA@carbon fiber composite nanomaterial obtained in Comparative Example 1 of the present disclosure.
Figure 8:
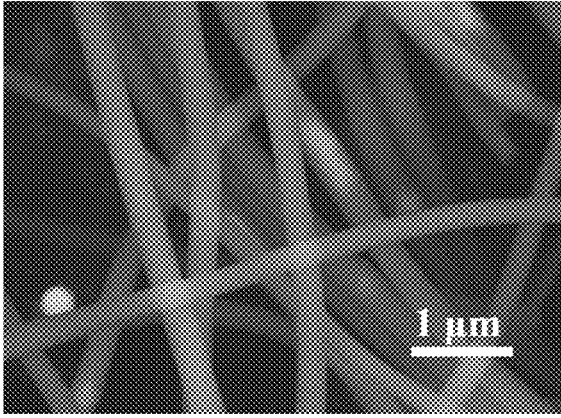
FIG. 8 shows a SEM image of the $Sn_{0.5}Sb_{0.5}CuFe_{0.5}Zn_{0.5}$ HEA@carbon fiber composite nanomaterial obtained in Comparative Example 2 of the present disclosure.

FIG. 6 shows an XRD pattern of the SnSbCuTiZn HEA@carbon fiber composite nanomaterial. As shown in FIG. 6, the product obtained in this example corresponds well to the standard card of $Cu_6Sn_5$ (JCPDS NO. 45-1488). Ti atoms replace Cu atoms and are randomly distributed in the unit cell, thus forming the SnSbCuTiZn HEA. According to the method of Example 1, the SnSbCuTiZn HEA@carbon fiber composite nanomaterial prepared in this example was used as a working electrode to assemble into a button-type battery, which was subjected to electrochemical performance testing. As a negative electrode material for a LIB, its discharge specific capacity could reach 227.6 mAh/g after 300 cycles at a current density of 1,000 mA/g.

Example 4

A method for preparing an SnSbCuFeZn HEA@carbon fiber composite nanomaterial was performed as follows:
- (1) 1.00 mmol of $C_{16}H_{30}O_4Sn$, 1.00 mmol of $Sb(CH_3COO)_3$, 1.00 mmol of $Cu(CH_3COO)_2$, 1.00 mmol of $Fe(NO_3)_3$, and 1.00 mmol of $Zn(CH_3COO)_2$ were weighed and dissolved in 6.00 mL of DMF, 1.00 mmol of citric acid was added thereto, and a resulting mixture was stirred magnetically at room temperature for 6 h to obtain a dark red mixed metal salt solution.
- (2) 0.60 g of PAN was dissolved in the dark red mixed metal salt solution obtained in step (1), and a resulting mixture was stirred magnetically at 60° C. for 16 h to obtain a homogeneous electrospinning precursor solution.
- (3) The homogeneous electrospinning precursor solution obtained in step (2) was transferred into a syringe and the syringe and a syringe needle were kept free of air bubbles, where a syringe needle model was 21 (with an inner diameter of 0.51 mm and an outer diameter of 0.81 mm); a precursor fiber membrane was prepared by electrospinning under the following conditions: a positive voltage of 25 kV, a negative voltage of –2 kV, a distance between the syringe needle and a receiver of 12 cm, a propulsion speed of 1.1 mm/min, an ambient temperature of 45° C., and an ambient humidity of 15%; where the receiver was an aluminum foil, and a receiving was achieved by flat plate receiving.

(4) The precursor fiber membrane obtained in step (3) was subjected to vacuum drying at 60° C. for 12 h, a resulting dried sample was placed in a crucible, and heated to 280° C. at a heating rate of 2° C./min in an air atmosphere and held for 2 h and then heated to 800° C. at a heating rate of 2° C./min in a nitrogen atmosphere and held for 3 h, and a resulting heated product was cooled to room temperature to obtain the SnSb-CuFeZn HEA@carbon fiber composite nanomaterial.

The SnSbCuFeZn HEA@carbon fiber composite nanomaterial prepared in this example has obvious fiber characteristics and a complete fiber structure. According to the method of Example 1, the SnSbCuFeZn HEA@carbon fiber composite nanomaterial prepared in this example was used as a working electrode to assemble into a button-type battery, which was subjected to electrochemical performance testing. As a negative electrode material for a LIB, its discharge specific capacity could reach 203.9 mAh/g after 300 cycles at a current density of 1,000 mA/g.

Example 5

A method for preparing an SnSbCuFeZn HEA@carbon fiber composite nanomaterial was performed as follows:

(1) 1.00 mmol of $SnCl_2 \cdot 2H_2O$, 1.00 mmol of $SbCl_3$, 1.00 mmol of $Cu(CH_3COO)_2$, 1.00 mmol of $FeCl_3$, and 1.00 mmol of $ZnCl_2$ were weighed and dissolved in 6.00 mL of DMF, 1.50 mmol of diethanolamine was added thereto, and a resulting mixture was stirred magnetically at room temperature for 4 h to obtain a light green mixed metal salt solution.

(2) 0.30 g of PAN and 0.30 g of PVP were weighed and dissolved in the light green mixed metal salt solution obtained in step (1), and a resulting mixture was stirred magnetically at 60° C. for 16 h to obtain a homogeneous electrospinning precursor solution.

(3) The homogeneous electrospinning precursor solution obtained in step (2) was transferred into a syringe, and the syringe and a syringe needle were kept free of air bubbles, where a syringe needle model was 22 (with inner diameter of 0.41 mm and an outer diameter of 0.71 mm); a precursor fiber membrane was prepared by electrospinning under the following conditions: a positive voltage of 23 kV, a negative voltage of –1.5 kV, a distance between the syringe needle and a receiver of 15 cm, a propulsion speed of 1.0 mm/min, an ambient temperature of 45° C., and an ambient humidity of 12%; where the receiver was an aluminum foil, and a receiving was achieved by roller receiving.

(4) The precursor fiber membrane obtained in step (3) was subjected to vacuum drying at 60° C. for 12 h, a resulting dried sample was placed in a crucible, and heated to 280° C. at a heating rate of 2° C./min in an air atmosphere and held for 2 h and then heated to 900° C. at a heating rate of 2° C./min in a nitrogen atmosphere and held for 3 h, and a resulting heated product was cooled to room temperature to obtain the SnSb-CuFeZn HEA@carbon fiber composite nanomaterial.

The SnSbCuFeZn HEA@carbon fiber composite nanomaterial prepared in this example has obvious fiber characteristics and a complete fiber structure. According to the method of Example 1, the SnSbCuFeZn HEA@carbon fiber composite nanomaterial prepared in this example was used as a working electrode to assemble into a button-type battery, which was subjected to electrochemical performance testing. As a negative electrode material for a LIB, its discharge specific capacity could reach 197.2 mAh/g after 300 cycles at a current density of 1,000 mA/g.

Comparative Example 1

A method for preparing an SnSbCuFeZn HEA@carbon fiber composite nanomaterial was performed as follows:

The method for preparing the composite nanomaterial was the same as that in Example 1, except that the calcination was conducted at 500° C. in a nitrogen atmosphere with a heating rate of 5° C./min. Compared with Example 1, the XRD pattern shows many characteristic diffraction peaks of oxides, indicating that the metal oxides are not carbon-thermally reduced and alloying reaction does not occur, resulting in a mixture of oxides. The SEM image shows that the outer surface of the fiber is smooth without any particles attached. The SnSbCuFeZn HEA@carbon fiber composite nanomaterial prepared in this comparative example was used as a working electrode to assemble into a button-type battery, which was subjected to electrochemical performance testing. As a negative electrode material for a LIB, its discharge specific capacity could reach 154.6 mAh/g after 300 cycles at a current density of 1,000 mA/g.

Comparative Example 2

A method for preparing an $Sn_{0.5}Sb_{0.5}CuFe_{0.5}Zn_{0.5}$ HEA@carbon fiber composite nanomaterial was performed as follows:

The method for preparing the composite nanomaterial was the same as that in Example 2, except that the citric acid was not added during the preparation of the mixed metal salt solution. The XRD pattern shows that there is a low diffraction peak intensity of the obtained sample, while the SEM image shows that the number of alloy nanoparticles in the carbon nanofibers is significantly reduced. According to the method of Example 1, the $Sn_{0.5}Sb_{0.5}CuFe_{0.5}Zn_{0.5}$ HEA@carbon fiber composite nanomaterial prepared in this comparative example was used as a working electrode to assemble into a button-type battery, which was subjected to electrochemical performance testing. As a negative electrode material for a LIB, its discharge specific capacity could reach 140.5 mAh/g after 300 cycles at a current density of 1,000 mA/g.

Comparative Example 3

A method for preparing an SnSbCuFeZn HEA@carbon fiber composite nanomaterial was performed as follows:

The method for preparing the composite nanomaterial was the same as that in Example 1, except that the electrospinning was conducted at a positive voltage of 10 kV, a syringe needle model of 17, and a distance between the syringe needle and a receiver of 5 cm. The composite nanomaterial has poor carbon nanofiber morphology and a large number of microspheres mixed therein, which is caused by poor spinning process leading to droplet formation (the positive voltage is too low to completely stretch the ejected spinning liquid droplets; the syringe needle model does not match and its diameter is too large, which easily causes droplets to splash onto the spinning membrane; the distance between the syringe needle and the receiver is too small, making the electrostatic stretching effect weak). According to the method of Example 1, the SnSbCuFeZn HEA@carbon fiber composite nanomaterial prepared in this comparative example was used as a working electrode to assemble into a button-type battery, which was subjected to electrochemical performance testing. As a negative electrode material for a LIB, its discharge specific capacity could reach only 108.2 mAh/g after 300 cycles at a current density of 1,000 mA/g.

Combining Examples 1 to 5 and Comparative Examples 1 to 3, it is demonstrated that a key point of the method for preparing the HEA@carbon fiber composite nanomaterial in the present disclosure is to prepare a stable and homogeneous electrospinning precursor solution. The dissolution of various metal salts in the organic solvent requires the introduction of a complexing agent. On one hand, it avoids the interaction between various metal ions and prevents the formation of corresponding hydroxide precipitation; on the other hand, it complexes with metal ions to generate fine metal clusters, overcomes the immiscibility between strongly repelling metal components, and accelerates the dissolution of metal ions. The appropriate temperature dissolution process requires sufficient stirring time, which can not only promote the close entanglement between polymer molecular chains, but also reduce the generation of condensation beads during the spinning. Moreover, the electrostatic attraction between polymer and metal ions is strengthened, which is conducive to the spatial confinement effect of carbon fibers on HEA nanoparticles during the subsequent calcination. The entropy stabilization effect of the HEA nanoparticles and the spatial confinement effect of the carbon nanofibers work synergistically, such that the battery exhibits excellent cycle stability and superior electrochemical performance.

The specific examples described above only express several embodiments of the present disclosure. The description is relatively detailed for easy understanding, but does not constitute a limitation on the scope of the present disclosure. Any changes and modifications made according to the technical concept of the present disclosure shall fall within the scope of the claims of the present disclosure.

What is claimed is:

1. A method for preparing a high-entropy alloy (HEA) @carbon fiber composite nanomaterial, comprising:
   (1) dissolving five or more metal salts of different metal elements in an organic solvent, adding a complexing agent to obtain a mixture, and then stirring the mixture at room temperature until the metal salts and the complexing agent are dissolved to obtain a mixed metal salt solution;
   (2) adding a polymer to the mixed metal salt solution obtained in step (1), dissolving by stirring, with a dissolution temperature of 20° C. to 80° C. and a dissolution time of 4 h to 36 h, to obtain an electrospinning precursor solution;
   (3) transferring the electrospinning precursor solution obtained in step (2) into a syringe and keeping the syringe and a syringe needle free of air bubbles, and then conducting electrospinning to obtain a precursor fiber membrane; and
   (4) subjecting the precursor fiber membrane obtained in step (3) to vacuum drying at a temperature of 40° C. to 80° C. for 12 h to 24 h, subjecting a resulting dried sample to pre-sintering in an air atmosphere, and then subjecting a resulting pre-sintered sample to calcination in an inert atmosphere to obtain the HEA@carbon fiber composite nanomaterial; wherein the electrospinning in step (3) is conducted under the following conditions: a positive voltage of 17 kV to 25 kV, a negative voltage of −0.5 kV to −2.0 kV, a syringe needle model of 23 to 20, a distance between the syringe needle and a receiver of 8 cm to 20 cm, a propulsion speed of 0.3 mm/min to 2.5 mm/min, an ambient temperature of 25° C. to 60° C., and an ambient humidity of 10% to 40%; and an aluminum foil or a silicone paper is used as the receiver, a receiving is achieved by one process selected from the group consisting of flat plate receiving and roller receiving, and during the receiving, a Taylor cone at a front end of the syringe needle remains stable without bifurcation.

2. The method of claim 1, wherein in step (1), the metal salts each are at least one selected form the group consisting of a chloride, a nitrate, a carbonate, a sulfate, and an organic salt, and
   a metal element in the metal salts is selected from the group consisting of tin, antimony, germanium, iron, cobalt, nickel, chromium, manganese, copper, zinc, titanium, vanadium, molybdenum, tungsten, magnesium, aluminum, and indium.

3. The method of claim 2, wherein in step (1), the metal salts in the mixed metal salt solution have a total molar concentration of 0.1 mol/L to 1.2 mol/L, and
   all metal elements in the metal salts have a total atomic proportion of 100%, with a percentage of each metal element ranging from 5% to 35%.

4. The method of claim 1, wherein the complexing agent is at least one selected from the group consisting of citric acid, sodium citrate, potassium pyrophosphate, acetylacetone, diethanolamine, sodium alginate, and oxalic acid, and
   the complexing agent in the mixed metal salt solution has a molar concentration of 0.1 mol/L to 0.8 mol/L.

5. The method of claim 1, wherein the organic solvent is at least one selected from the group consisting of N,N-dimethylformamide (DMF), N,N-dimethylacetamide (DMA), tetrahydrofuran (THF), dimethylacetamide (DMA), acetone, isopropanol, hexafluoroisopropanol (HFIP), and anhydrous ethanol.

6. The method of claim 1, wherein in step (2), the polymer is at least one selected from the group consisting of polyacrylonitrile (PAN), polyvinylpyrrolidone (PVP), polypropylene glycol (PPG), polystyrene (PS), polybenzimidazole (PBI), polymethyl methacrylate (PMMA), polyvinyl chloride (PVC), polyetherimide (PEI), polyvinylidene fluoride (PVDF), and polyvinyl acetate (PVA), and
   a ratio of a mass of the polymer to a total molar number of all metal elements in the metal salts is in a range of 0.2 g:1 mol to 0.2 g:2 mol.

7. The method of claim 1, wherein in step (4), the pre-sintering in the air atmosphere is performed by heating to a temperature of 200° C. to 280° C. at a first heating rate of 1° C./min to 5° C./min and holding for 1 h to 3 h, and
   the calcination in the inert atmosphere is performed by heating to a temperature of 600° C. to 1,200° C. at a second heating rate of 1° C./min to 10° C./min and holding for 2 h to 5 h.

* * * * *